(12) United States Patent
Reitmeier (10) Patent No.: US 6,549,240 B1
(45) Date of Patent: Apr. 15, 2003

(54) FORMAT AND FRAME RATE CONVERSION FOR DISPLAY OF 24HZ SOURCE VIDEO

(75) Inventor: Glenn A. Reitmeier, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/515,058

(22) Filed: Feb. 28, 2000

Related U.S. Application Data (63) Continuation-in-part of application No. 09/001,596, filed on Dec. 31, 1997, now abandoned.
(60) Provisional application No. 60/060,112, filed on Sep. 26, 1997.

(51) Int. Cl.$^7$ .............................................. H04N 11/20
(52) U.S. Cl. ..................... 348/459; 348/556; 348/445; 348/558

(58) Field of Search ................................. 348/459, 448, 348/581, 445, 556, 558, 449, 441

(56) References Cited

U.S. PATENT DOCUMENTS

| | | | | |
|---|---|---|---|---|
| 5,999,220 A | * | 12/1999 | Washino | 348/441 |
| 6,069,664 A | * | 5/2000 | Zhu et al. | 348/448 |
| 6,225,589 B1 | * | 4/2001 | Faroudja et al. | 348/448 |

* cited by examiner

*Primary Examiner*—Victor R. Kostak
(74) *Attorney, Agent, or Firm*—William J. Burke (57) ABSTRACT

An apparatus for electronic format and frame rate conversion in a multiple format video processing system adapted to avoid display motion artifacts causes by 3:2 conversion of 24 Hz video source video by tripling the frame rate of the source video and responsively adjusting the format of the resultant video signal.

27 Claims, 3 Drawing Sheets

FORMAT AND FRAME RATE CONVERSION FOR DISPLAY OF 24HZ SOURCE VIDEO

The invention claims benefit of U.S. Provisional Application No. 60/060,112, filed Sep. 26, 1997 and incorporated herein by reference in its entirety.

This application is a continuation-in-part of U.S. patent application Ser. No. 09/001,596, which was filed on Dec. 31, 1997 now abandoned and is incorporated herein by reference in its entirety.

This application is related to pending U.S. patent application Ser. No. 09/001,952, which was filed on Dec. 31, 1997 and is incorporated herein by reference in its entirety.

This application is related to pending U.S. patent application Ser. No. 09/001,620, which was filed on Dec. 31, 1997 and is incorporated herein by reference in its entirety.

The invention relates to video processing systems generally, and more particularly, video processing systems capable of receiving and processing a plurality of video signal formats, such as the various high definition and standard definition formats.

BACKGROUND OF THE DISCLOSURE

Present television receivers, such as NTSC (National Television Standards Committee) television receivers, include video processing circuitry that typically must process a video signal conforming to only a single, predetermined video format. Future digital television (DTV) receivers are expected to be implemented substantially in accordance with the transmission standards established by the Advanced Television Standards Committee (ATSC). A similar standard is the European Digital Video Broadcasting (DVB) standard. The ATSC and DVB standards are incorporated herein by reference in their entireties.

A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference. The new DTV standards allow broadcasters to deliver virtually any format up to 1920×1080 pixels. Specifically, DTV receivers must be capable of receiving source video comprising image sequences that vary in spatial resolution (480 lines, 720 lines, or 1080 lines), in temporal resolution (60 fps, 30 fps, or 24 fps), and in scanning format (2:1 interlaced or progressive scan).

It is known in the computer industry to display multiple graphics formats on a so-called "multisync" display device. Specifically, a multisync display changes horizontal and/or vertical scanning frequencies in response to a change in graphics format. Such a multisync approach may be implemented in a video or television environment by using, e.g., studio equipment raster formats standardized by the Society of Motion Picture and Television Engineers (SMPTE). Unfortunately, the multisync approach leads to an increase in cost due to the more complicated deflection circuitry, an increase in power consumption, and a high inter-format switching latency (i.e., greater than one video frame) due to long time constants associated with deflection coil inductance.

A better approach was disclosed by Lee in U.S. Pat. No. 5,485,216, issued Jan. 16, 1996 for Video Conversion Apparatus for High Definition Television, incorporated herein by reference in its entirety. In the Lee patent, a high definition television signal is decoded, then converted to a 30 Hz frame rate, then vertically decimated, then horizontally decimated and then interleaved to produce a 30 Hz, 1050 vertical scanning line video signal. Thus, the Lee arrangement provides a brute force technique for converting a high definition television signal into a 30 Hz, 1050 vertical scanning line video signal. The format-converted television signal is then processed in a conventional manner to produce a picture.

Unfortunately, the Lee arrangement disadvantageously requires complex timing, switching and video processing circuitry. In addition, the television signal produced by the Lee arrangement will inherently cause motion video artifacts on a display device in the case of 24 Hz source video (e.g., such as film). This is because the Lee arrangement uses the well known 3:2 pull-up sequence to convert 24 frames per second video into 60 frames per second, which results in motion jitter artifacts when the converted video is displayed. Since most prime time television is mastered on film, a large percentage of video material will be continue to be transmitted in one of the 24 Hz progressive scan formats.

Therefore, a need exists in the art for a cost-effective video processing system suitable for use in, e.g., a multiple format television receiver. It is also seen to be desirable to provide a video processing system that adapts to use of 24 Hz source video.

SUMMARY OF THE INVENTION

The invention is a method and concomitant apparatus for electronic format and frame rate conversion in a multiple format video processing system adapted to avoid display motion artifacts causes by 3:2 conversion of 24 Hz video source video by tripling the frame rate of the source video and responsively adjusting the format of the resultant video signal.

The invention preserves at least a multiple of the frame rate of a display device by adapting the spatial resolution of a digital video signal to be presented on the display device. The transmitted display format (i.e., horizontal and/or vertical resolution of the transmitted picture) is adapted to be compatible with an integer multiple of the transmitted picture frame rate.

One embodiment of the invention comprises an apparatus for processing a digital video signal including video imagery associated with at least one of a plurality of transmitted display formats to produce an output video signal suitable for presentation on a display device, the display device having associated with it a single predetermined horizontal scanning frequency, the apparatus comprises: a horizontal resizer, for adapting a horizontal format of the digital video signal in response to a first control signal; a vertical resizer, for adapting a vertical format of the digital video signal in response to a second control signal; a frame rate converter, for adapting by an integer multiple a frame rate of the digital video signal in response to a third control signal; and a controller, for generating the first, second and third control signals in response to the transmitted display format of the video imagery included within the digital video signal; wherein the controller causing the horizontal resizer to adapt the horizontal format of the digital video signal to a size compatible with the predetermined horizontal scanning frequency of the display device; the controller causing the vertical resizer to adapt the vertical format of the digital video signal to a size compatible with the adapted horizontal format of the digital video signal; and the controller, in the case of an input video signal having a frame rate of 24 Hz or 25 Hz, causing the frame rate converter to double, triple or quadruple the frame rate of the digital video signal.

BRIEF DESCRIPTION OF THE DRAWINGS

The teachings of the present invention can be readily understood by considering the following detailed description in conjunction with the accompanying drawings, in which.

DETAILED DESCRIPTION

The invention claims benefit of U.S. Provisional Application No. 60/060112, filed Sep. 26, 1997, and incorporated herein by reference in its entirety.

The invention will be described within the context of a digital television (DTV) receiver, illustratively an ATSC television receiver. However, it will be apparent to those skilled in the art that the invention is applicable to any multiple format video processing system, including those systems adapted to DVB, MPEG-1, MPEG-2 and other information streams. The invention is also suitable for use in the European system known as Phase Alternating Line (PAL) system and the similar Sequential Technique and Memory Storage (SECAM) system.

Figure 1:
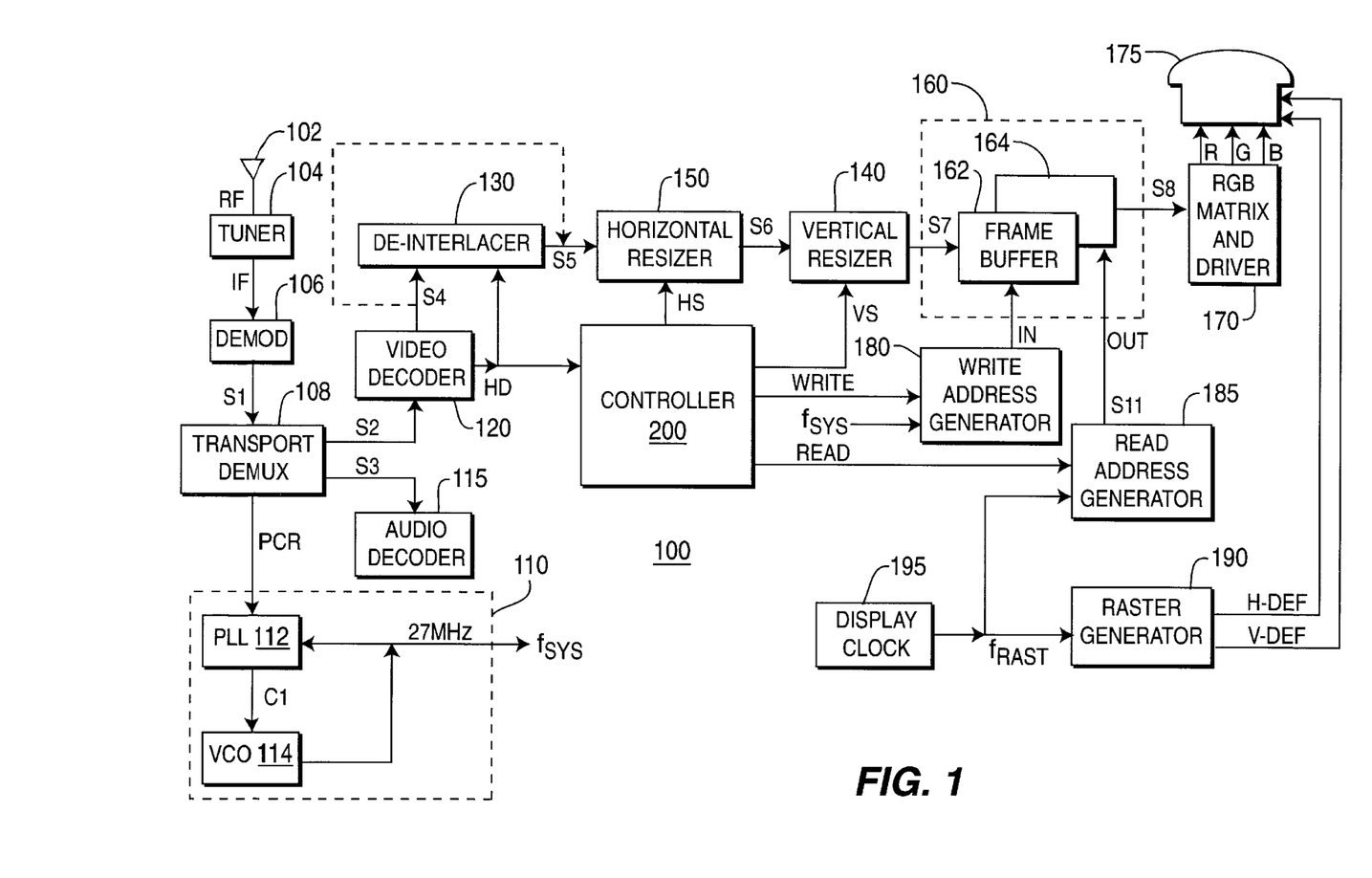
FIG. 1 shows high-level block diagram of a DTV receiver according to the invention.

FIG. 1 shows high-level block diagram of a DTV receiver 100 according to the invention. Specifically, the DTV receiver 100 comprises a video processing section and a timing section. The video processing section comprises a video decoder 120, an optional de-interlacer 130, a vertical resizer 140, a horizontal resizer 150 and a frame buffer 160. The timing section comprises a clock circuit 110, a raster generator 190, a display clock 195, a read address generator 180 and a write address generator 185. A video signal S2 to be processed by the video processing section is received by, e.g., a DTV front end comprising, e.g., an antenna 102, a tuner 104, a demodulator 106 and a transport demultiplexer 108. A processed video signal S8 is displayed (after appropriate color matrix processing) on, e.g., a display device 175 according to horizontal and vertical timing signals H-DEF and V-DEF that are produced by raster generator 190.

RF source 102 (illustratively, an antenna or cable television distribution network), provides a radio frequency (RF) signal RF comprising a plurality of television signals modulated according to a vestigial sideband (VSB), quadrature amplitude modulation (QAM) or other suitable modulation scheme. The provided RF television signals are coupled to tuner 104, which downconverts a desired television signal to produce a first intermediate frequency (IF) television signal IF. A demodulator 106, illustratively a VSB or QAM demodulator, demodulates the IF television signal IF to produce a digital information stream S1, illustratively an MPEG-like system stream S1 containing one or more MPEG-like program transport streams.

The MPEG-like program transport streams are analogous to NTSC channels, in that each program transport stream typically transports the video and audio portions of a single program, such as a movie or other audio-visual program. Each program transport stream comprises a plurality of elementary streams associated with the video and audio portions of the transported audio-visual program.

Transport demultiplexer 108 operates in a known manner to demultiplex a particular program transport stream from the MPEG-like system stream S1. Elementary audio stream(s) S3 associated with the demultiplexed program transport stream are coupled to an audio decoder 115 for decoding prior to processing by an audio driver circuit (not shown). Elementary video stream(s) S2 associated with the demultiplexed program transport stream are coupled to video decoder 120.

Transport demultiplexer 108 also extracts a program clock reference (PCR) signal included in so-called adaptation fields of selected transport stream packets (i.e., reference packets) of the demultiplexed program transport stream. The PCR is a sample of the 27 MHz clock that was used to encode the demultiplexed program transport stream prior to transmission of the program transport stream. The extracted PCR is coupled to clock circuit 110.

Clock circuit 110 comprises, illustratively, a phase locked loop (PLL) 112, and a voltage controlled oscillator (VCO) 114. The clock circuit 110 generates a system clock $f_{SYS}$, illustratively a 27 MHz system clock suitable for processing MPEG-like information streams. The clock circuit 110 utilizes the PCR extracted from the demultiplexed program transport stream to lock the decoder system clock (i.e., the system clock $f_{SYS}$) of DTV receiver 100 to the system clock of the encoder that produced demultiplexed program transport stream.

PLL 112 operates in a known manner to generate a control signal C1 in response to a comparison of the (nominally) 27 MHz output of the VCO 114 to the PCR received from the transport demultiplexer 108. VCO 114, in response to control signal C1, operates in a known manner to increase or decrease the frequency of the 27 MHz system clock $f_{SYS}$.

Video decoder 120 decodes the video stream S2 in a standard manner to produce a decoded video signal S4 having a given transmission format and frame rate. The video decoder 120 examines the sequence header of video stream S2 to determine the format, colorimetry (if available) and other information associated with the video signal encoded within video stream S2. Upon examining the sequence header, video decoder 140 couples the format, colorimetry and other information to an output as a header data signal HD.

Optional de-interlacer 130 receives the decoded video signal S4 and at least a portion of the header data signal HD. If the decoded video signal S4 comprises video information having an interlaced format (as indicated by the HD signal), then de-interlacer 130 converts the decoded video signal S4 into a progressive scan format video signal that is coupled to an output as video signal S5. If the decoded video signal S4 comprises video information having a progressive scan format, then de-interlacer 130 couples the decoded video signal S4 directly to the output as video signal S5. The de-interlacer 130 may be implemented, illustratively, using a motion-adaptive approach that requires frame(s) storage, or using a straightforward a vertical interpolation or line repetition approach.

Horizontal resizer 150 receives the video signal S5 and, in response to a control signal HS from controller 200, selectively changes the number of picture elements (pixels) per line of video information included within video signal S5. Horizontal resizer 150 produces a horizontally resized video signal S6. Horizontal resizer 150 is capable of increasing the number of pixels per line by, e.g., using interpolation techniques to calculate luminance and chrominance information of a new pixel to be inserted between two existing pixels. Horizontal resizer 150 is capable of decreasing the number of pixels per line by, e.g., decimating a video line by removing every Nth pixel in the line.

Vertical resizer 140 receives the horizontally resized video signal S6 and, in response to a control signal VS from a controller 200, selectively changes the number of vertical scanning lines per frame of video information included within video signal S6. Vertical resizer 140 produces a vertically resized video signal S7. Vertical resizer 140 is capable of increasing the number of lines per video frame by, e.g., using interpolation techniques to calculate luminance and chrominance information of a new line to be inserted between two existing lines. Vertical resizer 140 is also capable of decreasing the number of lines per video frame by, e.g., decimating a video frame by using interpolation techniques to calculate new scan lines at a reduced line density.

In the case of optional de-interlacer 130 being implemented using the aforementioned vertical interpolation, or line repetition approach, the de-interlacing function may be incorporated within vertical resizing unit 140. In this case, horizontal resizer 150 is coupled to receive the decoded video signal S4 directly from the video decoder 120, as indicated by the dashed line in FIG. 1.

Frame buffer 160 receives the selectively vertically and horizontally resized video signal S7. Frame buffer 160 is a double buffering type of frame buffer comprising an input frame store buffer 162 and an output frame store buffer 164. The video information within video signal S7 is stored in the input frame store buffer 162 in response to a buffer input control signal IN. When the contents of the output frame store buffer 164 are entirely read, the contents of the input frame store buffer 162 are used as the output frame store buffer 164. That is, the input buffer and output buffer are functionally swapped, thereby obviating the need to transfer input buffer information into an output buffer. The video information stored in the output frame store buffer 164 is coupled to a frame buffer output as buffered video signal S8 in response to a buffer output control signal OUT. Since frame buffer 160 is a double buffering type of frame buffer, output data may be retrieved from the output frame store buffer 164 at data rate that is higher (or lower) than the rate at which input data is stored in the input frame store buffer 162. That is, the clock frequency associated with video signal S7 does not need to be the same as the clock frequency associated with buffered video signal S8. To utilize 30 Hz video information for 60 Hz display, each video frame is read out twice from the output frame store buffer 164 before the next video frame is move into the output frame store buffer 164.

Frame buffer 160 is, preferably, a double buffering arrangement as depicted in FIG. 1. It must be noted that a single buffering arrangement may also be used, but that the single buffer arrangement tends to produce a "tearing" artifact on a displayed image when the buffer read and buffer write rates are different. In the exemplary embodiment, the buffer read rate (determined by the OUT signal) and the buffer write rate (determined by the IN signal) are likely to be different, and, in the case of 24 Hz source video, will be differed as will be described below. Such display rate conversion is required, since the direct use of a low transmission frame rate video signal (such as 24 or 30 Hz) would cause undesirable large area flicker for images displayed using most display technologies.

RGB matrix and driver 170 receives the buffered video signal S8. RGB matrix and driver 170 operates in a known manner to process buffered video signal S8 according to matrix coefficients, transfer characteristics and color primary information included within a sequence header of elementary video stream S2. Specifically, RGB matrix and driver 170 performs the color conversion processing needed to convert the transmitted Y, Cr, Cb color components to the red (R), green (G) and blue (B) color signals needed for display. The three color signals R, G, and B are coupled to a display device 175, where each color signal is used to drive, e.g., an associated electron gun in a picture tube (not shown). It must be noted that the three color signals R, G, and B generated by RGB matrix and driver 170 may require additional amplification by appropriate driver circuitry (not shown) before being coupled to the display device 175.

Raster generator 190 generates a fixed frequency horizontal deflection signal H-DEF and a vertical deflection signal V-DEF in a conventional manner in response to a raster clock signal $f_{RAST}$. The raster clock signal $f_{RAST}$ is generated in a conventional manner by a display clock circuit 195. The horizontal and vertical deflection signals H-DEF, V-DEF are used to drive, e.g., associated horizontal and vertical deflection coils, respectively, in a picture tube. It must be noted that the horizontal and vertical deflection signals H-DEF, V-DEF generated by raster generator 190 may require amplification by appropriate driver circuitry (not shown) before being coupled to the display device 175.

Write address generator 180 generates the frame buffer input control signal IN in response to a control signal WRITE, from controller 200, and the clock signal $f_{SYS}$ Similarly, read address generator 185 generates the buffer output control signal OUT in response to a control signal READ, from controller 200, and a clock signal $f_{RAST}$. It is important to note that the video information within video signal S7 is stored in the input frame store buffer 162 at a rate determined by a system clock $f_{SYS}$. Similarly, the video information stored in the output frame store buffer 164 is retrieved at a rate determined by a raster clock $f_{RAST}$. Thus, in the case of, e.g., a 27 MHz display clock (e.g., optionally related to the 27 MHz system clock $f_{SYS}$) and 81 MHz raster clock $f_{RAST}$, data is retrieved from the frame buffer 160 at three times the storage rate.

Controller 200 may be implemented in a standard manner using a standard microprocessor, a memory unit comprising, and input/output port and associated support circuitry. Controller 200 may also comprise a special purpose digital signal processing circuit. Controller 200 receives format, colorimetry and other information relating to the decoded video signal S4 from the video decoder 120 via the header data signal HD. Controller 200 utilizes this information, and additional information related to the display device 175 (e.g., the native format of the display device), to generate a vertical size control signal VS for vertical resizer 140, a horizontal size control signal HS for horizontal resizer 150, a write address control signal WRITE for write address generator 180 and a read address control signal READ for read address generator 185

In one embodiment of the invention, all of the above processing and storage operations are performed using the 4:2:0 sampling (i.e., MPEG YUV) component format in order to minimize processing and storage requirements.

An ATSC receiver, such as the exemplary DTV receiver 100 of FIG. 1, will need to process video signals according to at least the ATSC recommended compression formats. These formats are shown below in Table 1. In Table 1, "P" denotes progressive scan and "I" denotes interlaced scan. It should also be noted that the frame rate numbers shown in Table 1 are integer values; the ATSC standard also allows the frame rate values to be multiplied by 1000/1001 (i.e., 59.94 Hz, instead of 670 Hz based).

TABLE 1

| Vertical lines | Pixels | Aspect Ratio | Picture rate |
|---|---|---|---|
| 1080 | 1920 | 16:9 | 60I, 30P, 24P |
| 720 | 1280 | 16:9 | 60P, 30P, 24P |
| 480 | 704 | 16:9 and 4:3 | 60P, 60I, 30P, 24P |
| 480 | 640 | 4:3 | 60P, 60I, 30P, 24P |

In the DTV receiver 100 of FIG. 1, the normally independent video format conversion and display rate conversion processes are controlled and coordinated according to the invention. That is, the video format of an input video signal is controlled using the de-interlacer 130, the vertical resizer 140 and the horizontal resizer 150. Similarly, the display rate conversion process is controlled using the write address generator 180 and the read address generator 185. The controller 200 controls both processes, and coordinates the use of the processes to ensure that the image displayed on the display device 175 does not include motion artifacts caused by the use of 24 Hz source material in 60 Hz display devices.

Thus, in one embodiment of the DTV receiver 100 of FIG. 1, the display device 175 operates at a frame refresh rate of 60 Hz (or 59.94 Hz), with a horizontal deflection frequency selected to implement one of the transmitted formats (the so-called native display format). Transmitted video information having a field or frame rate of 60 Hz (or 59.94 Hz) is not subjected to frame rate conversion. By contrast, transmitted video information having a frame rate 30 Hz (or 29.97 Hz) is converted to 60 Hz (or 59.94 Hz) using a 2:1 frame repeat. That is, the controller 200 causes the output frame store buffer 164 of frame buffer 160 to be read twice for each frame.

Since 24 Hz frame rates cannot be displayed on a 60 hz (or even 30 Hz) display device without the undesirable motion artifacts due to the typical 3:2 frame rate conversion process, the DTV receiver 100 of FIG. 1 operates in a different manner when 24 Hz video is decoded. Specifically, the 24 Hz (or 24*1000/1001 Hz) video is resized, as necessary in the format conversion process, and subsequently converted to 72 Hz (or 72*1000/1001 Hz) video in the frame rate conversion process. The display device 175 is operated at a 72 Hz refresh rate when 24 Hz video is present. It must be noted that the format conversion process is adapted to the 72 Hz frame rate conversion by the controller 200, as will be explained below.

Optionally, the 24 Hz (or 24*1000/1001 Hz) video is resized, as necessary in the format conversion process, and subsequently converted to 48 Hz (or 48*1000/1001 Hz) video in the frame rate conversion process. In the case of 48 Hz operation, one skilled in the art using the teachings of this disclosure will be able to adapt the various parameters associated with implementing the described 72 Hz method and apparatus to a 48 Hz method and apparatus. Such 48 Hz operation may be desirable where the display device is a liquid crystal display device. It is important to note that by utilizing an integer multiple (i.e., three for 72 Hz and 2 for 48 Hz), the invention avoids 3:2 artifacts as described herein.

Figure 2:
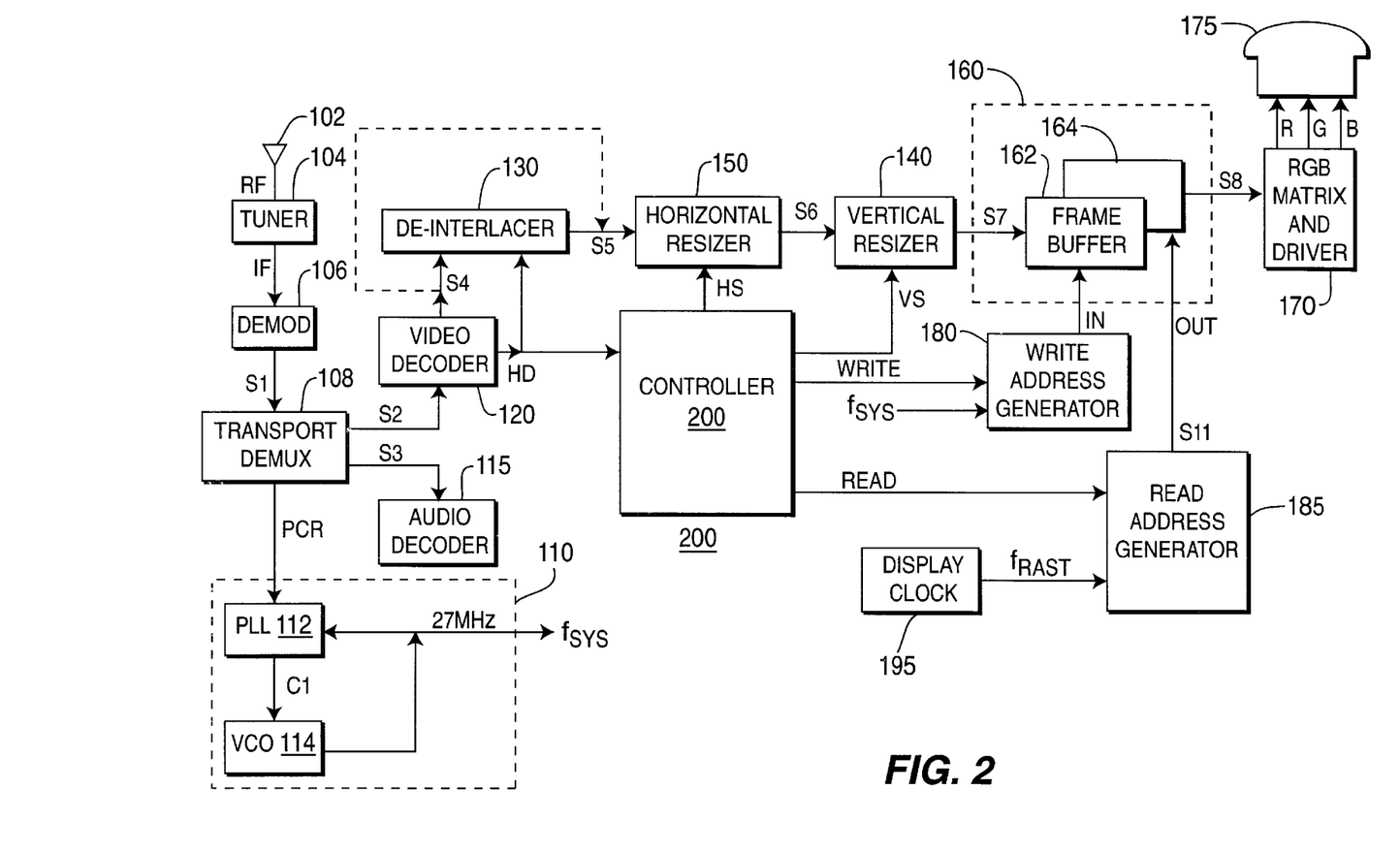
FIG. 2 shows high-level block diagram of a DTV receiver according to the invention and including a light valve display.

FIG. 2 shows high-level block diagram of a DTV receiver according to the invention and including a light valve display. Since the DTV receiver 200 of FIG. 2 operates in substantially the same manner as the DTV receiver 100 of FIG. 1, only differences between the two figures will be discussed. Specifically, the DTV receiver 200 includes a display 175 comprising, illustratively, a light valve or digital micromirror display (DMD) type, or liquid crystal display (LCD) type of projection display. As such, the DTV receiver 200 of FIG. 2 does not include circuitry for generating horizontal and vertical deflection signals. In this embodiment, the read address generator 185 is switched to a 6/5 (i.e., 72/60) higher frequency to provide a 72 Hz readout of the double buffered frame display when 24 Hz transmission formats are present. It should be noted that spatial format adjustments of 24 Hz transmission formats are generally not required for such displays.

The following discussion will assume that the display device 175 comprises a cathode ray tube (CRT) display. In order to implement the invention in a cost-effective manner in CRT-based receivers, the horizontal deflection frequency of the CRT display should remain constant, thus requiring a 5/6 (i.e., 60/72) change in the number of scan lines. To change the number of scan lines, controller 200 causes vertical resizer 140 to reduce the number of lines in the video signal S5. To repeat a frame (i.e., 2:1 repeat), controller 200 causes the output frame store buffer 164 to be read twice before receiving the next frame. To repeat a frame twice (i.e., 3:1 repeat), controller 200 causes the output frame store buffer 164 to be read three times before receiving the next frame.

Table 2 shows a listing of video transmission and display formats, and processing parameters suitable for processing such video signals within the context of the DTV receiver 100. Specifically, the processing parameters are suitable for processing such video signals in the above-described manner for the case of display device 175 being a 1920 pixel by 1080 line progressive scan display having a horizontal scanning frequency of 64.8 kHz. It should be noted that this display 175 is operated in a 900 line mode in the case of 24 Hz source video.

The vertical interpolation parameter (Vert. Interp.), horizontal interpolation parameter (Horiz. Interp.) and frame repeat parameter (Frame Repeat) comprise, respectively, the vertical resizing factor, the horizontal resizing factor, and the frame rate conversion factor to be utilized by the controller 200 in response to a particular transmission format. The controller 200 modifies these parameters, as previously discussed, to preserve a fixed horizontal display frequency and to avoid motion related artifacts in the case of 24 Hz source video.

TABLE 2

| Transmit Format | Trans. Rate | Display Format | Disp. Rate | De-Int ? | Vert. Interp. | Horiz. Interp. | Frame Repeat |
|---|---|---|---|---|---|---|---|
| 1920 × 1080 | 60I | 1920 × 1080 | 60P | yes | 1 | 1 | 1:1 |
| | 30P | 1920 × 1080 | 60P | no | 1 | 1 | 2:1 |
| | 24P | 1920 × 900 | 72P | no | 5/6 | 1 | 3:1 |

TABLE 2-continued

| Transmit Format | Trans. Rate | Display Format | Disp. Rate | De-Int ? | Vert. Interp. | Horiz. Interp. | Frame Repeat |
|---|---|---|---|---|---|---|---|
| 1280 × 720 | 60P | 1920 × 1080 | 60P | no | 3/2 | 3/2 | 1:1 |
| | 30P | 1920 × 1080 | 60P | no | 3/2 | 3/2 | 2:1 |
| | 24P | 1920 × 900 | 72P | no | 9/4 | 3/2 | 3:1 |
| 704 × 480 | 60P | 1920 × 1080 | 60P | no | 9/4 | 30/11 | 1:1 |
| (16:9) | 60I | 1920 × 1080 | 60P | yes | 9/4 | 30/11 | 1:1 |
| | 30P | 1920 × 1080 | 60P | no | 9/4 | 30/11 | 2:1 |
| | 24P | 1920 × 900 | 72P | no | 15/8 | 30/11 | 3:1 |
| 704 × 480 | 60P | 1408 × 1080 | 60P | no | 9/4 | 2/1 | 1:1 |
| | 60I | 1408 × 1080 | 60P | yes | 9/4 | 2/1 | 1:1 |
| | 30P | 1408 × 1080 | 60P | no | 9/4 | 2/1 | 2:1 |
| | 24P | 1408 × 900 | 72P | no | 15/8 | 2/1 | 3:1 |
| 640 × 480 | 60P | 1920 × 1080 | 60P | no | 9/4 | 2/1 | 1:1 |
| | 60I | 1920 × 1080 | 60P | yes | 9/4 | 2/1 | 1:1 |
| | 30P | 1920 × 1080 | 60P | no | 9/4 | 2/1 | 2:1 |
| | 24P | 1408 × 900 | 72P | no | 15/8 | 2/1 | 3:1 |
| 750 × 576 | 50I | 720 × 576 | 100P | yes | 1 | 1 | 1:1 |
| ($f_H = 4 \times$ 15.625 kHz) | 25P | 720 × 864 | 75P | no | 3/2 | 1 | 3:1 |

Table 2 also depicts the processing of a 750 line, 576 pixel transmission format utilizing 50 interlaced frames per second or 25 non-interlaced frames per second. Such a transmission format is typically utilized in, e.g., non-ATSC digital television systems such as systems compliant with the aforementioned European DVB standard. It is noted that for this DVB transmission format, the horizontal frequency of the display device has been modified to be approximately 4×15.625 kHz (the standard PAL horizontal scanning frequency), or approximately 62.5 kHz.

In the case of 25 non-interlaced frames per second, the controller 200 causes the frame rate to be quadrupled to 100 frames per second, and causes the number of presented pixels per line to be increased to, illustratively, 864 pixels. It will be appreciated by those skilled in the art that other modifications may be made to the display format, and that the exemplary modifications are those that the inventor has deemed to be the most appropriate.

Table 3 shows the same type of information as listed above in Table 2, except that Table 3 is directed to the case of display device 175 being a 1280 pixel by 720 line progressive scan display having a horizontal scanning frequency of 45 kHz. It should be noted that this display is operated in a 600 line mode in the case of 24 Hz source video.

TABLE 3

| Transmit Format | Trans. Rate | Display Format | Disp. Rate | De-Int ? | Vert. Interp. | Horiz. Interp. | Frame Repeat |
|---|---|---|---|---|---|---|---|
| 1920 × 1080 | 60I | 1280 × 720 | 60P | yes | 2/3 | 2/31 | 1:1 |
| | 30P | 1280 × 720 | 60P | no | 2/3 | 2/3 | 2:1 |
| | 24P | 1280 × 600 | 72P | no | 5/9 | 2/3 | 3:1 |
| 1280 × 720 | 60P | 1280 × 720 | 60P | no | 1 | 1 | 1:1 |
| | 30P | 1280 × 720 | 60P | no | 1 | 1 | 2:1 |
| | 24P | 1280 × 600 | 72P | no | 5/6 | 1 | 3:1 |
| 704 × 480 | 60P | 1280 × 720 | 60P | no | 3/2 | 20/11 | 1:1 |
| (16:9) | 60I | 1280 × 720 | 60P | yes | 3/2 | 20/11 | 1:1 |
| | 30P | 1280 × 720 | 60P | no | 3/2 | 20/11 | 2:1 |
| | 24P | 1280 × 600 | 72P | no | 5/4 | 20/11 | 3:1 |
| 704 × 480 | 60P | 960 × 720 | 60P | no | 3/2 | 15/11 | 1:1 |
| | 60I | 960 × 720 | 60P | yes | 3/2 | 15/11 | 1:1 |
| | 30P | 960 × 720 | 60P | no | 3/2 | 15/11 | 2:1 |
| | 24P | 960 × 600 | 72P | no | 5/4 | 15/11 | 3:1 |
| 640 × 480 | 60P | 960 × 720 | 60P | no | 3/2 | 3/2 | 1:1 |
| | 60I | 960 × 720 | 60P | yes | 3/2 | 3/2 | 1:1 |
| | 30P | 960 × 720 | 60P | no | 3/2 | 3/2 | 2:1 |
| | 24P | 960 × 600 | 72P | no | 5/4 | 3/2 | 3:1 |
| 750 × 576 | 50I | 720 × 564 | 100P | yes | 3/2 | 1 | 1:1 |
| ($f_H = 3 \times$ 15.625 kHz) | 25P | 720 × 384 | 75P | no | 2/3 | 1 | 3:1 |

Table 3 also depicts the processing of a 750 line, 576 pixel transmission format utilizing 50 interlaced frames per second or 25 non-interlaced frames per second. It is noted that in this case the horizontal frequency of the display device has been modified to be 3×approximately 15.625 kHz, or approximately 46.875 kHz.

In the case of 25 non-interlaced frames per second, the controller 200 causes the frame rate to be tripled to 75 frames per second, and causes the number of presented pixels per line to be decreased to, illustratively, 384 pixels. In the case of 50 interlaced frames per second, the controller

200 causes the frame rate to be doubled to 100 frames per second, and causes the number of presented pixels per line to be decreased to, illustratively, 564 pixels. It will be appreciated by those skilled in the art that other modifications may be made to the display format, and that the exemplary modifications are those that the inventor has deemed to be the most appropriate.

Table 4 shows the same type of information as listed above in Tables 2–3, except that Table 4 is directed to the case of display device 175 being a 1920 pixel by 1080 line interlaced scan display having a horizontal scanning frequency of 32 kHz. It should be noted that this display is operated in a 900 line mode in the case of 24 Hz source video. The above approach for 1920×1080 progressive scan (Table 2) is used, but with modifications appropriate to the fact that the display is interlaced.

In this case, the complexity and memory required to implement the de-interlacer 130 can be substantially reduced, since the highest rate de-interlacing needs only be performed on 480 line format video. It should also be noted that the read address generation circuitry must be modified such that the double frame buffer 160 is capable of producing an interlaced scan format output signal S8.

has been modified to be 2×approximately 15.625 kHz, or approximately 31.25 kHz.

In the case of 25 non-interlaced frames per second, the controller 200 causes the frame rate to be tripled to 75 frames per second, and causes the number of presented pixels per line to be decreased to, illustratively, 384 pixels. In the case of 50 interlaced frames per second, the controller 200 causes the frame rate to be doubled to 100 frames per second, and causes the number of presented pixels per line to be decreased to, illustratively, 564 pixels. It will be appreciated by those skilled in the art that other modifications may be made to the display format, and that the exemplary modifications are those that the inventor has deemed to be the most appropriate.

Table 5 shows the same type of information as listed above in Tables 2–4, except that Table 5 is directed to the case of display device 175 being a 1280 pixel by 720 line interlaced scan display having a horizontal scanning frequency of 22.5 kHz. It should be noted that this display is operated in a 600 line mode in the case of 24 Hz source video. The above approach for 1280×720 progressive scan (Table 3) is used, but with modifications appropriate to the

TABLE 4

| Transmit Format | Trans. Rate | Display Format | Disp. Rate | De-Int ? | Vert. Interp. | Horiz. Interp. | Frame Repeat |
|---|---|---|---|---|---|---|---|
| 1920 × 1080 | 60I | 1920 × 1080 | 60P | yes | 1 | 1 | 1:1 |
|  | 30P | 1920 × 1080 | 60P | no | 1 | 1 | 2:1 |
|  | 24P | 1920 × 900 | 72P | no | 5/6 | 1 | 3:1 |
| 1280 × 720 | 60P | 1920 × 1080 | 60P | no | 3/2 | 3/2 | 1:1 |
|  | 30P | 1920 × 1080 | 60P | no | 3/2 | 3/2 | 2:1 |
|  | 24P | 1920 × 900 | 70I | no | 5/4 | 3/2 | 3:1 |
| 704 × 480 | 60P | 1920 × 1080 | 60I | no | 9/4 | 30/11 | 1:1 |
| (16:9) | 60I | 1920 × 1080 | 60I | yes | 9/4 | 30/11 | 1:1 |
|  | 30P | 1920 × 1080 | 60I | no | 9/4 | 30/11 | 2:1 |
|  | 24P | 1920 × 900 | 72I | no | 15/8 | 30/11 | 3:1 |
| 704 × 480 | 60P | 1408 × 1080 | 60I | no | 9/4 | 2/1 | 1:1 |
|  | 60I | 1408 × 1080 | 60I | yes | 9/4 | 2/1 | 1:1 |
|  | 30P | 1408 × 1080 | 60I | no | 9/4 | 2/1 | 2:1 |
|  | 24P | 1408 × 900 | 72I | no | 15/8 | 2/1 | 3:1 |
| 640 × 480 | 60P | 1920 × 1080 | 60I | no | 9/4 | 2/1 | 1:1 |
|  | 60I | 1920 × 1080 | 60I | yes | 9/4 | 2/1 | 1:1 |
|  | 30P | 1920 × 1080 | 60I | no | 9/4 | 2/1 | 2:1 |
|  | 24P | 1408 × 900 | 72I | no | 15/8 | 2/1 | 3:1 |
| 750 × 576 | 50I | 720 × 576 | 100P | yes | 3/2 | 1 | 1:1 |
| ($f_H$ = 2 × 15.625 kHz) | 25P | 720 × 384 | 75P | no | 2/3 | 1 | 3:1 |

Table 4 also depicts the processing of a 750 line, 576 pixel transmission format utilizing 50 interlaced frames per second or 25 non-interlaced frames per second. It is noted that in this case the horizontal frequency of the display device fact that the display is interlaced. Also, as noted above with respect to Table 4, the complexity and memory required in the de-interlacer 130 can be substantially reduced, and the read address generation circuitry 185 must be modified.

TABLE 5

| Transmit Format | Trans. Rate | Display Format | Disp. Rate | De-Int ? | Vert. Interp. | Horiz. Interp. | Frame Repeat |
|---|---|---|---|---|---|---|---|
| 1920 × 1080 | 60I | 1280 × 720 | 60P | yes | 2/3 | 2/31 | 1:1 |
|  | 30P | 1280 × 720 | 60P | no | 2/3 | 2/3 | 2:1 |
|  | 24P | 1280 × 600 | 72P | no | 5/9 | 2/3 | 3:1 |
| 1280 × 720 | 60P | 1280 × 720 | 60P | no | 1 | 1 | 1:1 |
|  | 30P | 1280 × 720 | 60P | no | 1 | 1 | 2:1 |
|  | 24P | 1280 × 600 | 72P | no | 5/6 | 1 | 3:1 |
| 704 × 480 | 60P | 1280 × 720 | 60P | no | 3/2 | 20/11 | 1:1 |
| (16:9) | 60I | 1280 × 720 | 60P | yes | 3/2 | 20/11 | 1:1 |

TABLE 5-continued

| Transmit Format | Trans. Rate | Display Format | Disp. Rate | De-Int? | Vert. Interp. | Horiz. Interp. | Frame Repeat |
|---|---|---|---|---|---|---|---|
| | 30P | 1280 × 720 | 60P | no | 3/2 | 20/11 | 2:1 |
| | 24P | 1280 × 600 | 72P | no | 5/4 | 20/11 | 3:1 |
| 704 × 480 | 60P | 960 × 720 | 60P | no | 3/2 | 15/11 | 1:1 |
| | 60I | 960 × 720 | 60P | yes | 3/2 | 15/11 | 1:1 |
| | 30P | 960 × 720 | 60P | no | 3/2 | 15/11 | 2:1 |
| | 24P | 960 × 600 | 72P | no | 5/4 | 15/11 | 3:1 |
| 640 × 480 | 60P | 960 × 720 | 60P | no | 3/2 | 3/2 | 1:1 |
| | 60I | 960 × 720 | 60P | yes | 3/2 | 3/2 | 1:1 |
| | 30P | 960 × 720 | 60P | no | 3/2 | 3/2 | 2:1 |
| | 24P | 960 × 600 | 72P | no | 5/4 | 3/2 | 3:1 |

Tables 2–5 include several occurrences of interpolation ratios such as 30/11, 20/11 and 15/11. It should be noted that these ratios could be simplified to, respectively, 3/1, 2/1 and 3/2 in order to reduce interpolator complexity. Such simplification would, of course, result in some cropping of the active picture area.

Figure 3:
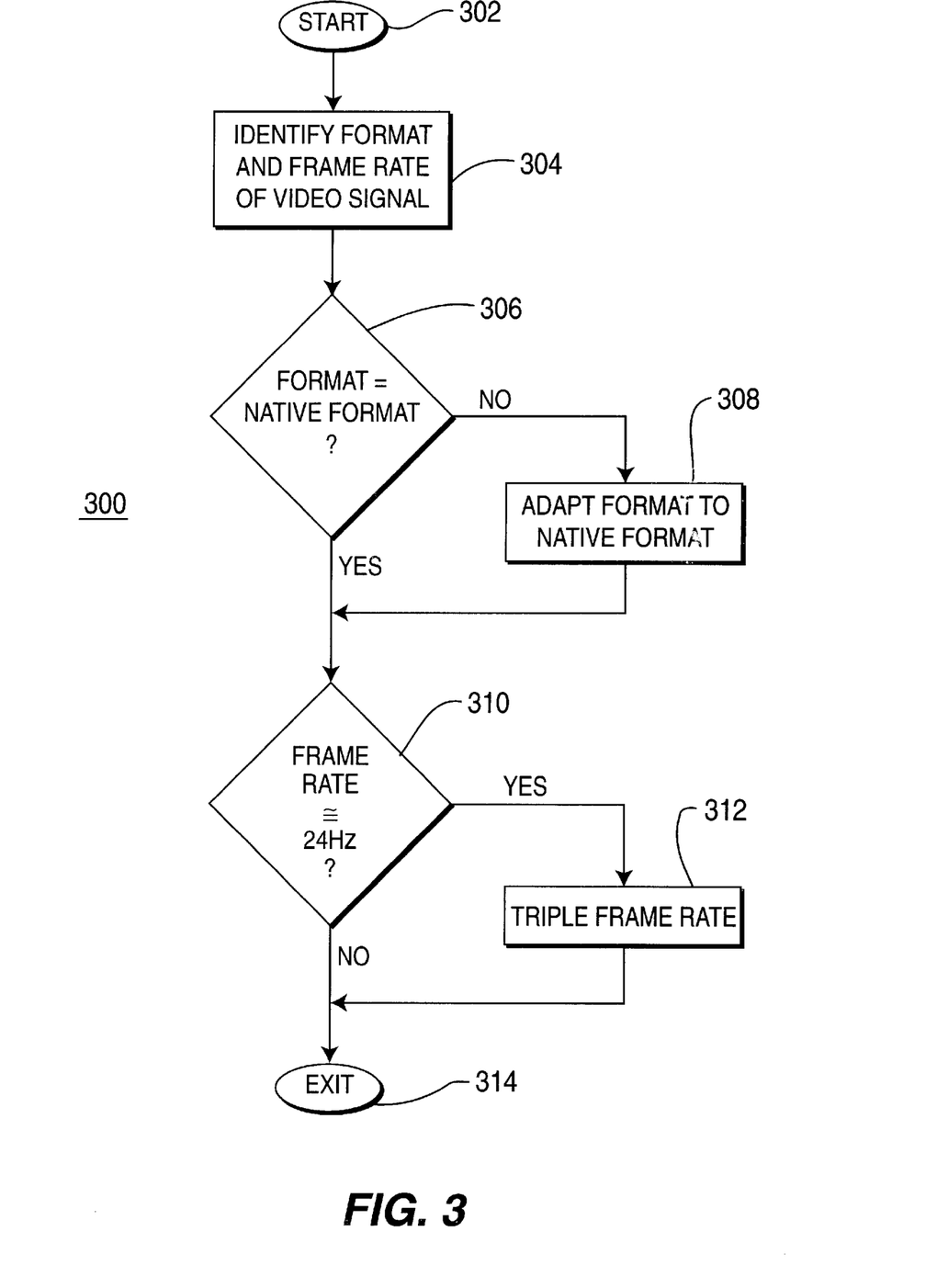
FIG. 3 is a flow diagram of a method for processing a video signal according to the invention.

FIG. 3 is a flow diagram of a method 300 for processing a video signal according to the invention. Specifically, FIG. 3 is a flow diagram of a method for optimally formatting a video signal such that a 3:2 pull-up artifact is not propagated through to a display device, such as the display device 175 depicted in FIGS. 1 and 2. The routine 300 of FIG. 3 may be implemented in hardware, software or a combination of hardware and software utilizing, illustratively, controller 200 of FIGS. 1 and 2.

The routine 300 of FIG. 3 is entered at step 302, when an input video signal is received by either the DTV receiver of FIG. 1, or the DTV receiver 200 of FIG. 2. At step 304 the format and frame rate of the video signal is identified, and the routine proceeds to step 306. At step 306 a query is made as to whether the format of the received video signal is compatible with the native format of the display device 175. If the query at step 306 is answered negatively, then the routine proceeds to step 308, where the format of the video signal is adapted to conform to the native format of the display device. The routine 300 then proceeds to step 310. If the query at step 306 is answered affirmatively, then the routine 300 proceeds to step 310.

At step 310 a query is made as to whether the frame rate of the received video signal is equal to approximately 24 Hz (e.g., 24 Hz or 23.97 Hz). If the query at step 310 is answered negatively, then the routine 300 proceeds to step 314, where it is exited. If the query at step 310 is answered affirmatively, then the routine 300 proceeds to step 312, where the frame rate of the received video signal is tripled. That is, at step 312 the controller 200 causes a frame rate converter to increase the approximately 24 Hz frame rate of the input video signal to approximately 72 Hz. In this manner 3:2 pull-up artifacts typically associated with converting a 24 frame per second video signal into, e.g., 30 Hz or 60 Hz frame rate video signals are avoided. The routine 300 then proceeds to step 314, where it is exited.

The above-described embodiments of the invention provide methods and apparatus that avoid display motion artifacts causes by 3:2 conversion of 24 Hz video source video. There are other format related functions that may be used to optimize the operations of, e.g., a multiple video format DTV receiver. For example, a multiple format video signal processing system operating in conjunction with a display device timing system to produce synchronized video and timing signals suitable for use by a fixed horizontal scanning frequency display device is described in more detail in co-pending U.S. patent application Ser. No. 09/001,952 filed on Dec. 31, 1997, and incorporated herein by reference in its entirety. Another example is a video processing system that automatically adjusts video processor operations, such as horizontal peaking, vertical peaking and colorimetry parameters, depending upon the format of a received video signal is described in more detail in pending U.S. patent application Ser. No. 09/001,620, filed on Dec. 31, 1997, and incorporated herein by reference in its entirety.

The invention preserves at least a multiple of the frame rate of a display device by adapting the spatial resolution of a digital video signal to be presented on the display device. The transmitted display format (i.e., horizontal and/or vertical resolution of the transmitted picture) is adapted to be compatible with an integer multiple of the transmitted picture frame rate. The invention is applicable to display devices utilizing any of the NTSC, PAL or SECAM standards. Moreover, while the invention is readily adaptable to any display device, the use of the invention is especially well suited to those display devices utilizing a substantially fixed horizontal scanning frequency adapts the transmitted display or picture format of a digital video signal in a manner preserving the Although various embodiments which incorporate the teachings of the present invention have been shown and described in detail herein, those skilled in the art can readily devise many other varied embodiments that still incorporate these teachings.

What is claimed is:

1. Apparatus for processing a digital video signal including video imagery associated with at least one of a plurality of transmitted display formats to produce an output video signal suitable for presentation on a display device, said display device having associated with it a single predetermined horizontal scanning frequency, said apparatus comprising:

a horizontal resizer, for adapting a horizontal format of said digital video signal in response to a first control signal;

a vertical resizer, for adapting a vertical format of said digital video signal in response to a second control signal;

a frame rate converter, for adapting by an integer multiple a frame rate of said digital video signal in response to a third control signal; and a controller, for generating said first, second and third control signals in response to the transmitted display format of the video imagery included within said digital video signal; wherein said controller causing said horizontal resizer to adapt the horizontal format of said digital video signal to a size compatible with said predetermined horizontal scanning frequency of said display device;

said controller causing said vertical resizer to adapt the vertical format of said digital video signal to a size compatible with said adapted horizontal format of said digital video signal; and said controller, in the case of an input video signal having a frame rate selected from the group of 24 and 25 Hz, causing said frame rate converter to multiply by n integer greater than 2 the frame rate of said digital video signal.

2. The apparatus of claim 1, further comprising:
a de-interlacer, for converting an interlaced digital video signal into a progressive scan digital video signal, said de-interlacer processing said digital video signal prior to said horizontal resizer, said vertical resizer and said frame rate converter.

3. The apparatus of claim 1, wherein said frame rate converter comprises a frame buffer for receiving said digital video signal according to a first addressing rate and providing a buffered digital video signal according to a second addressing rate, said second addressing rate being an integer multiple of said first addressing rate.

4. The apparatus of claim 3, wherein said second addressing rate is determined with respect to a display clock, said display clock providing a timing signal suitable for use in deriving horizontal and vertical deflection signals suitable for use by said display device.

5. The apparatus of claim 4, further comprising:
a raster generator, coupled to said display clock, for generating horizontal and vertical deflection signals suitable for use by said display device.

6. The apparatus of claim 1, wherein said display device substantially comprises 1920 pixel by 1080 line progressive scan display having a horizontal scanning frequency of approximately 65 kHz; and wherein:
in the case of said digital video signal having a 24 Hz, 1920 pixel by 1080 line transmitted display format, said controller causes said output video signal to approximate one of a 48 Hz, 1920 pixel by 1080 line transmitted display format video signal and a 72 Hz, 1920 pixel by 900 line transmitted display format video signal.

7. The apparatus of claim 1, wherein said display device substantially comprises 1920 pixel by 1080 line progressive scan display having a horizontal scanning frequency of approximately 65 kHz; and wherein:
in the case of said digital video signal having a 24 Hz and a 16:9 aspect ratio transmitted display format, said controller causes said output video signal to approximate a 1920 pixel by 900 line transmitted display format video signal having a frame rate of 48 Hz or 72 HZ.

8. The apparatus of claim 1, wherein said display device substantially comprises 1920 pixel by 1080 line progressive scan display having a horizontal scanning frequency of approximately 65 kHz; and wherein:
in the case of said digital video signal having a 24 Hz and a 4:3 aspect ratio transmitted display format, said controller causes said output video signal to approximate a 1408 pixel by 900 line transmitted display format video signal having a frame rate of 48 Hz or 72 HZ.

9. The apparatus of claim 1, wherein said display device substantially comprises 1920 pixel by 1080 line progressive scan display having a horizontal scanning frequency of approximately 63 kHz; and wherein:
in the case of said digital video signal having a 25 Hz transmitted display format, said controller causes said output video signal to approximate a 720 pixel by 864 line transmitted display format video signal having a frame rate of 75 HZ.

10. The apparatus of claim 1, wherein said display device substantially comprises 1920 pixel by 1080 line progressive scan display having a horizontal scanning frequency of approximately 63 kHz; and wherein: in the case of said digital video signal having a 50 Hz transmitted display format, said controller causes said output video signal to approximate a 720 pixel by 576 line transmitted display format video signal having a frame rate of 100 HZ.

11. The apparatus of claim 1, wherein said display device substantially comprises 1280 pixel by 720 line progressive scan display having a horizontal scanning frequency of approximately 45 kHz; and wherein:
in the case of said digital video signal having a 24 Hz and a 16:9 aspect ratio transmitted display format, said controller causes said output video signal to approximate a 1280 pixel by 600 line transmitted display format video signal having a frame rate of 48 Hz or 72 HZ.

12. The apparatus of claim 1, wherein said display device substantially comprises 1280 pixel by 720 line progressive scan display having a horizontal scanning frequency of approximately 45 kHz; and wherein:
in the case of said digital video signal having a 24 Hz and a 4:3 aspect ratio transmitted display format, said controller causes said output video signal to approximate a 960 pixel by 600 line transmitted display format video signal having a frame rate of 48 Hz or 72 HZ.

13. The apparatus of claim 1, wherein said display device substantially comprises 1280 pixel by 720 line progressive scan display having a horizontal scanning frequency of approximately 47 kHz; and wherein:
in the case of said digital video signal having a 25 Hz transmitted display format, said controller causes said output video signal to approximate a 720 pixel by 384 line transmitted display format video signal having a frame rate of 75 HZ.

14. The apparatus of claim 1, wherein said display device substantially comprises 1280 pixel by 720 line progressive scan display having a horizontal scanning frequency of approximately 47 kHz; and wherein:
in the case of said digital video signal having a 50 Hz transmitted display format, said controller causes said output video signal to approximate a 720 pixel by 564 line transmitted display format video signal having a frame rate of 100 HZ.

15. The apparatus of claim 1, wherein said display device substantially comprises 1920 pixel by 1080 line interlaced scan display having a horizontal scanning frequency of approximately 32 kHz; and wherein:
in the case of said digital video signal having a 24 Hz and a 16:9 aspect ratio transmitted display format, said controller causes said output video signal to approximate a 1920 pixel by 1280 line transmitted display format video signal having a frame rate of 48 Hz or 72 HZ.

16. The apparatus of claim 1, wherein said display device substantially comprises 1920 pixel by 1080 line interlaced scan display having a horizontal scanning frequency of approximately 32 kHz; and wherein:

in the case of said digital video signal having a 24 Hz and a 4:3 aspect ratio transmitted display format, said controller causes said output video signal to approximate a 1408 pixel by 900 line transmitted display format video signal having a frame rate of 48 Hz or 72 HZ.

17. The apparatus of claim 1, wherein said display device substantially comprises 1920 pixel by 1080 line interlaced scan display having a horizontal scanning frequency of approximately 32 kHz; and wherein: in the case of said digital video signal having a 25 Hz transmitted display format, said controller causes said output video signal to approximate a 720 pixel by 384 line transmitted display format video signal having a frame rate of 75 Hz.

18. The apparatus of claim 1, wherein said display device substantially comprises 1920 pixel by 1080 line interlaced scan display having a horizontal scanning frequency of approximately 32 kHz; and wherein:

in the case of said digital video signal having a 50 Hz transmitted display format, said controller causes said output video signal to approximate a 720 pixel by 576 line transmitted display format video signal having a frame rate of 100 Hz.

19. The apparatus of claim 1, wherein said display device substantially comprises 1280 pixel by 720 line interlaced scan display having a horizontal scanning frequency of approximately 23 Hz; and wherein:

in the case of said digital video signal having a 24 Hz and a 16:9 aspect ratio transmitted display format, said controller causes said output video signal to approximate a 1280 pixel by 600 line transmitted display format video signal having a frame rate of 48 Hz or 72 HZ.

20. The apparatus of claim 1, wherein said display device substantially comprises 1280 pixel by 720 line interlaced scan display having a horizontal scanning frequency of approximately 23 Hz; and wherein:

in the case of said digital video signal having a 24 Hz and a 4:3 aspect ratio transmitted display format, said controller causes said output video signal to approximate a 960 pixel by 600 line transmitted display format video signal having a frame rate of 48 Hz or 72 HZ.

21. The apparatus of claim 1, wherein said display device comprises one of a light valve, DMD or LCD display device.

22. A method for processing a digital video signal including video imagery associated with at least one of a plurality of transmitted display formats to produce an output video signal suitable for presentation on a display device, said display device having associated with it a single predetermined horizontal scanning frequency, said method comprising the steps of:

adapting a horizontal format of said digital video signal to a size compatible with said predetermined horizontal scanning frequency of said display device;

adapting a vertical format of said digital video signal to a size compatible with said adapted horizontal format of said digital video signal; and multiplying a frame rate of said digital video signal by an integer multiple greater than 2 in response to said input video signal having a frame rate selected from the group consisting of 24 Hz and 25 hz.

23. The method of claim 22, further comprising the step of de-interlacing said input video signal in the case of said input video signal comprising an interlaced digital video signal.

24. The method of claim 22, wherein a frame rate converter is used to perform said step of multiplying, said frame rate converter comprising a frame buffer for receiving said digital video signal according to a first addressing rate and providing a buffered digital video signal according to a second addressing rate, said second addressing rate being an integer multiple of said first addressing rate.

25. The method of claim 24, wherein said second addressing rate is determined with respect to a display clock, said display clock providing a timing signal suitable for use in deriving horizontal and vertical deflection signals suitable for use by said display device.

26. The method of claim 25, further comprising the step of generating, using a raster generator coupled to said display clock, horizontal and vertical deflection signals suitable for use by said display device.

27. Method for use in a video processing system, said video processing system comprising a format converter and a frame rate converter, said format converter adapting at least one of a vertical format and a horizontal format of an input video signal in response to a format control signal, said frame rate converter adapting a frame rate of said input video signal in response to a frame rate control signal, said method comprising the steps of:

identifying a format and frame rate of said input video signal;

adapting said format of said Input video signal to a native display format having associated with it a predetermined horizontal scanning frequency; and in the case of said frame rate of said input video signal being selected from the group consisting of 24 Hz and 25 Hz, multiplying said frame rate of said input video signal by an Integer greater than 2, wherein the spatial resolution of the input video signal is adapted to be compatible with the multiplied frame rate of the input video signal.

* * * * *

UNITED STATES PATENT AND TRADEMARK OFFICE
CERTIFICATE OF CORRECTION

PATENT NO.     : 6,549,240 B1
DATED          : April 15, 2003
INVENTOR(S)    : Glenn Reitmeier It is certified that error appears in the above-identified patent and that said Letters Patent is hereby corrected as shown below:

<u>Column 17,</u>
Lines 27 and 37, please change "23 Hz" to -- 23 kHz --.

Signed and Sealed this

Ninth Day of September, 2003

JAMES E. ROGAN
*Director of the United States Patent and Trademark Office*